United States Patent Office 3,756,963
Patented Sept. 4, 1973

3,756,963
PROCESS FOR PREPARING A DIMERIZATION CATALYST
Lucio Forni, Milan, Italy, assignor to Società Italiana Resine S.p.A., Milan, Italy
No Drawing. Filed Nov. 18, 1971, Ser. No. 200,181
Claims priority, application Italy, Nov. 26, 1970, 32,211/70
Int. Cl. B01j
U.S. Cl. 252—447    9 Claims

ABSTRACT OF THE DISCLOSURE

Catalysts for the production of 4-methyl-1-pentene are made by heating graphite, potassium carbonate or other carrier in an inert gas, adding an alkali metal and a thermally decomposable mercury salt, and again heating in an inert gas.

---

The present invention relates to catalysts for the production of 4-methyl-1-pentene by dimerisation of propylene and to the relative manufacturing process.

It is well-known that 4-methyl-1-pentene can be used in the production of polymers of interesting applications, more precisely for polymers characterised by high crystallinity and transparency, excellent mechanical and electrical properties, high stability and resistance to chemical agents.

Such polymers can be advantageously used in the manufacture of transparent articles, sanitary articles, containers and lining foils for the conservation of foodstuffs, components for electrical equipment etc.

The polymers of 4-methyl-1-pentene are normally prepared by catalytic polymerisation of the Ziegler type, in moderate conditions.

In order to obtain polymers with the above-described properties, particularly high crystallinity and transparency, it is necessary to use particularly pure 4-methyl-1-pentene.

It is already known that 4-methyl-1-pentene is normally produced by dimerisation of propylene in the presence of catalysts consisting of alkali metals carried on graphites or other supports such as $K_2CO_3$, alkali metal silicates, alkali metal halides, $MgSO_4$, talcum.

However, such processes have the disadvantage of not being characterised by high selectivity for 4-methyl-1-pentene on account of the contemporary production of substantial quantities of other isomers of 4-methyl-1-pentene, such as cis-4-methyl-2-pentene, trans-4-methyl-2-pentene, 2-methyl-1-pentene, 2-methyl-2-pentene, 1-hexene, cis-2-hexene, trans-2-hexene, cis-3-hexene and trans-3-hexene. In practice, not withstanding various artifices, above all in the preparation of the catalyst, around 85% selectivity can be attained but the usual values are comprised between 50 and 65%.

It is however necessary to subject the reaction mixture to troublesome operations of purification and sometimes, on account of the large quantity of isomers, to isomerisation processes in respect of the by-products in order to recover useful product.

The object of the present invention is to provide catalysts which have a high selectivity for 4-methyl-1-pentene in processes in which 4-methyl-1-pentene is produced by dimerisation of propylene.

A further object of the present invention is a process for producing such catalysts.

According to the present invention, the catalysts suitable for production with a high selectivity of 4-methyl-1-pentene by dimerisation of propylene can be produced by a process which consists essentially in initially subjecting the carrier, preferably of controlled granulation, to a thermal treatment, in adding to the carrier an alkali metal and a thermally decomposable mercury salt, separately or in mixture inter se, and in heating the product obtained after accurate blending to a temperaure between 150° C. and 350° C. for a time ranging from 1 to 10 minutes and under continuous agitation.

The catalyst obtained after cooling makes it possible to obtain, in the process of dimerisation of propylene, a very high selectivity for 4-methyl-1-pentene normally equal to or greater than 90% while maintaining high rates of conversion. More particularly, the particles of carrier, preferably ground and sieved in order to produce a granulation ranging from 10 to 30 mesh, and dried for at least 5 hours, preferably 12 hours, at a temperature of between 100 and 150° C., are heated in a flow of inert gas at a temperautre of above 150° C. for more than half an hour and preferably for one hour.

Heating is preferably carried out in a stream of anhydrous nitrogen at a temperature of around 250° C. The carrier, after cooling to room temperature, still in a stream of inert gas, has an alkali metal added to it, preferably potassium, which has preferably been carefully washed and maintained under xylene, and a thermally decomposable mercury salt, separately and/or in mixture, so that the total content of alkali metal and mercury ions in the carrier is between 1 and 80% by weight. In one embodiment of the present invention, graphite is used as a carrier in a granulation comprises between 10 and 30 mesh which, after the above-described treatment, has alkali metal and mercury salt added to it so that the total content of alkali metal and mercury ions is between 30 to 50% by weight.

In another embodiment, potassium carbonate is used in a granulation of 20 to 30 mesh, which after treatment as above, has alkali metal and mercury salt added to it in such a way that the total content of alkali metal and mercury ions is between 2 and 10% by weight.

Furthermore, the quantity of mercury salt added is such as to produce a ratio by weight of mercury ion to alkali metal of 1:9 to 1:1 and preferably 1:3 to 1:1.1. According to the present invention, the term thermally decomposable mercury salts relates to those monovalent or bivalent mercury salts which have a decomposition point below 350° C., for example acetates, carbonates, oxalates, nitrates, benzoates, cyanides, halides and aminomercuric compounds. Such salts can be used by themselves or in mixture.

In the preferred embodiment of the present invention, mercury acetate is used which is added together with metallic potassium to the carrier in a current of anhydrous nitrogen and under continuous agitation.

Still in a current of inert gas and still with continuous agitation, the temperature of the mixture is raised to a level comprised beween 150 and 350° C. and preferably between 220 and 260° C. for a period of between 1 and 10 minutes and preferably 2 and 4 minutes.

Under these conditions, it is considered that the product reacts with the alkali metal and disperses very finely therewith over the carrier, resulting finally in being adsorbed into the outer surface of the carrier and partly absorbed into the pores of the carrier itself.

After cooling, the catalyst is ready for the propylene dimerisation process with a selectivity for 4-methyl-1-pentene equal to or greater than 90% while maintaining high rates of conversion.

For this purpose, the catalyst must be kept and handled at all times under nitrogen, even during transfer to the dimerisation reactor.

This catalyst is used in the dimerisation of propylene under the conditions normally used with supported alkali metal based catalysts already known in the prior art. More particularly, the best results are obtained by working in the range from 0.1 to 50 parts of liquid propylene supplied to one part of catalyst per hour at temperatures of 100 to 250° C. and pressures of 20 kg./sq. cm. to 350 kg./sq. cm.

The present invention will now be illustrated by the following examples which do not imply any limitation on the actual invention.

EXAMPLE 1

10 g. of graphite ranging in granulation from 10 to 30 mesh were dried for one night at 120° C. Subsequently, 4.64 g. of the thus dried graphite were heated for one hour in a stream of anhydrous nitrogen at a temperature of approx. 250° C. After cooling to room temperature, the graphite, still in a stream of anhydrous nitrogen, had 1.36 g. metallic potassium which had been carefully washed and maintained under xylene added to it, together with as much mercury acetate as was necessary to produce a proportion of potassium to mercury ions of 1:0.75, under continuous agitation.

Still in a stream of nitrogen and under continuous agitation, the temperature of the mixture was raised to 250° C. and maintained at that temperature for 2 minutes.

The resulant catalyst, after cooling, was charged into a tubular reactor operating at 150° C. and 70 kg./sq. cm. In a test lasting 6 hours, in which the reactor was supplied with 5 parts liquid propylene per part of catalyst and per hour, a conversion of propylene of 17.5% with selectivity of 90.5% to 4-methyl-1-pentene with approx. 9.5% of other isomers was achieved, with minimal traces of heavy products.

EXAMPLE 2

6 g. of catalyst produced according to the conventional technique and consisting of 4.5 g. graphite and 1.5 g. metallic potassium, were charged into a tubular reactor operating at 150° C. and 70 kg./sq. cm.

In a test conducted as in Example 1, a conversion of 17% of the propylene supplied with selectivity of 64.8% to 4-methyl-1-pentene and 34.5% to other isomers and the balance of heavy products, was achieved.

EXAMPLE 3

10 g. $K_2CO_3$ in a granulation comprised between 20 and 30 mesh, were dried for one night at 120° C.

Subsequently 5.7 g. of the $K_2CO_3$ which had been thus dried were heated for one hour in a stream of anhydrous nitrogen at a temperature of approx. 250° C.

After cooling to room temperature, the $K_2CO_3$, still in a stream of anhydrous nitrogen, had 0.3 g. metallic potassium which had been carefully washed and maintained under xylene added to it, together with as much mercury acetate as was required to produce a proportion of 1:0.75 of potassium to mercury ion, the addition taking place under continuous agitation.

Still in a stream of nitrogen and under continuous agitation, the temperature of the mixture was raised to 250° C. and maintained at that temperature for 2 minutes.

After cooling, the catalyst produced was charged into a tubular reactor working at 150° C. and 70 kg./sq. cm. In a test lasting 6 hours in which 0.5 part liquid propylene was supplied to the reactor for every part of catalyst and per hour, a conversion of 6.1% with a selectivity of 91% for 4-methyl-1-pentene and approx. 9% of other isomers and minimum traces of heavy products was achieved.

EXAMPLE 4

6 g. of catalyst produced according to the conventional method and consisting of 5.7 g. $K_2CO_3$ and 0.3 g. metallic potassium were subjected to a test under the same conditions as Example 3 and provided a conversion of approx. 6% with a selectivity of 84.5% to 4-methyl-1-pentene, 15% of other isomers and 0.5% heavy products.

What I claim is:

1. A process for producing supported alkali metal-based catalysts suitable for the preparation of 4-methyl-1-pentene by dimerisation of propylene, characterised:
   by initial heating of the particles of carrier in a stream of inert gas to a temperature in excess of 150° C. for a time exceeding half-an-hour;
   by addition to the particles of carrier, after cooling to room temperature, of an alkali metal and a mercury salt with a decomposition point below 350° C., separately and/or in mixture, so that the total content of alkali metal and mercury ion on the carrier is comprised between 1 and 80% by weight, while the proportion by weight of mercury ion to alkali metal is comprised between 1:9 and 1:1;
   by raising the temperature to a value comprised between 150 and 350° C. under continuous agitation and in a stream of inert gas, the temperature being maintained thus for a period of time ranging from 1 to 10 minutes.

2. A process as in claim 1, characterised in that the proportion by weight of mercury ion to alkali metal is between 1:3 and 1:1.1.

3. A process as in claim 1, characterised in that the temperature between 150 and 350° C. is a temperature of 220° to 260° C.

4. A process as in claim 1, characterised in that the period of time ranging from 1 to 10 minutes is a period of 2 to 4 minutes.

5. A process as in claim 1, characterised in that the salts used are chosen from acetates, carbonates, oxalates, nitrates, benzoates, cyanides, halides and amino-mercuric compounds of mercury, monovalent or bivalent, alone or in mixture.

6. A process as in claim 1, characterised by the use of graphite as a carrier, in a granulation ranging from 10 to 30 mesh and by the addition to such graphite of alkali metal and mercury salt so that the total content of alkali metal and mercury ion is comprised between 30 and 50% by weight.

7. A process as in claim 1, characterised by the use of potassium carbonate as a carrier, in a granulation of 20 to 30 mesh and by the addition to such potassium carbonate of alkali metal and mercury salt so that the total content of alkali metal and mercury ion is comprised between 2 and 10% by weight.

8. A process as in claim 1, characterised by the use of inert materials such as alkali metal silicates, alkali metal halides, magnesium sulphate and talcum as carriers.

9. A process as in claim 1, characterised in that potassium is the alkali metal used.

References Cited

UNITED STATES PATENTS

| | | | |
|---|---|---|---|
| 3,305,599 | 2/1967 | Fadra et al. | 260—683.15 E |
| 3,331,884 | 7/1967 | Yeo et al. | 260—683.15 E |
| 3,278,634 | 10/1966 | Mägerlein et al. | 260—683.15 E |
| 3,311,673 | 3/1967 | Hall et al. | 260—683.15 E |
| 3,325,559 | 6/1967 | Yeo et al. | 260—683.15 E |
| 3,340,323 | 9/1967 | Mägerlein et al. | 252—447 X |

FOREIGN PATENTS

| | | | |
|---|---|---|---|
| 1,167,858 | 10/1969 | Great Britain | 260—683.15 E |

OTHER REFERENCES

Chemical Abstracts, vol. 57, 16395e (1962).

HELEN M. S. SNEED, Primary Examiner

U.S. Cl. X.R.

252—475; 260—683.15 E